United States Patent Office 3,611,663
Patented Oct. 12, 1971

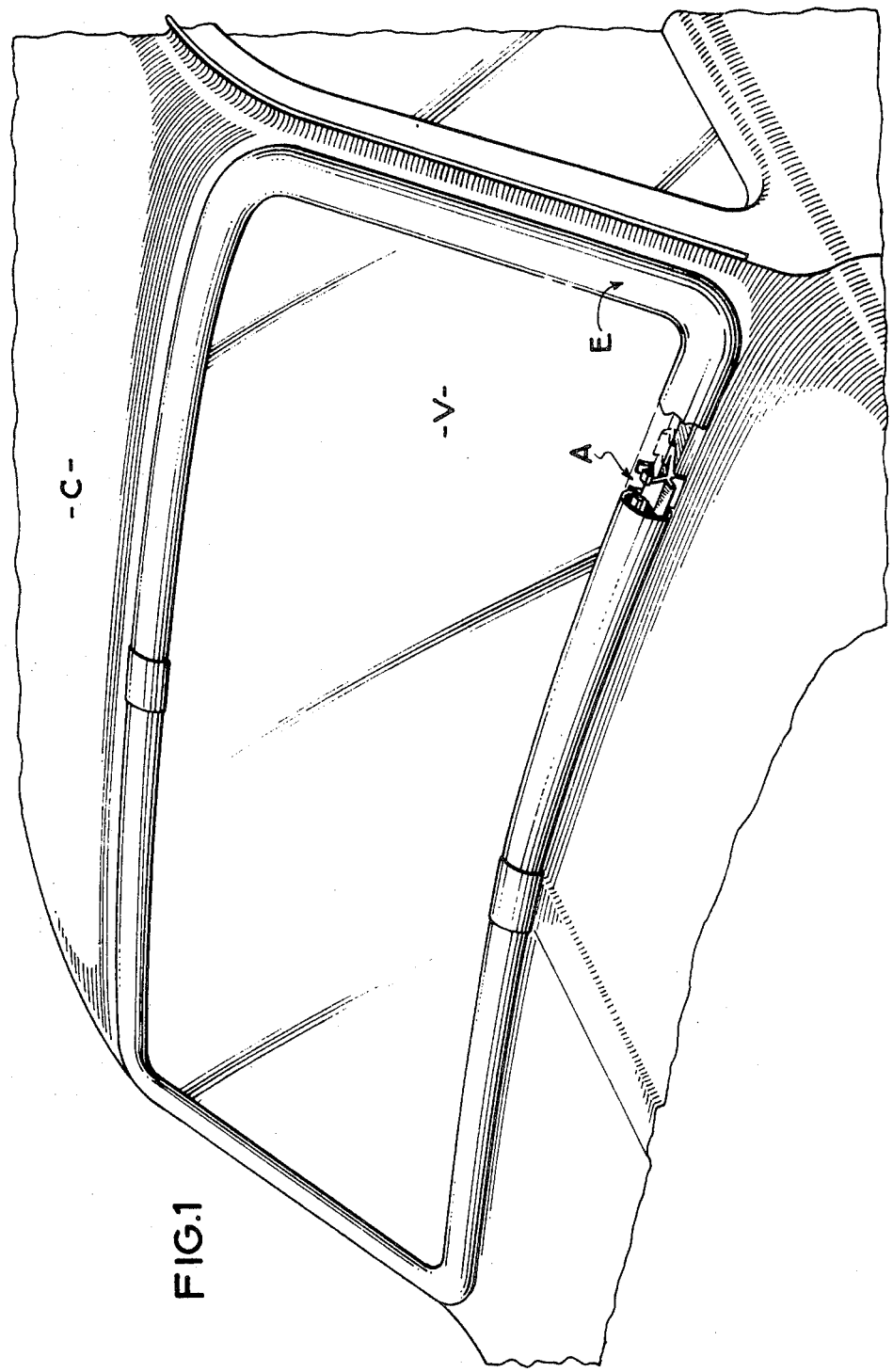

3,611,663
DEVICE FOR MOUNTING AN EMBELLISHING ELEMENT AROUND A FIXED WINDOW OF A VEHICLE
Michel Andrey, Montbeliard, France, assignor to Automobiles Peugeot, Paris, and Regie-Nationale des Usines Renault, Billancourt, France
Filed May 12, 1970, Ser. No. 36,626
Claims priority, application France, Dec. 19, 1969, 6918476
Int. Cl. E04b 1/62
U.S. Cl. 52—397
11 Claims

ABSTRACT OF THE DISCLOSURE

Device for mounting an embellishing strip around a glass windowpane fixed in a fillister of the body of a vehicle. The device comprises at least one mount engaged on the edge of the glass and locked between this edge and the adjacent edge of the fillister. The or each mount has on the face thereof facing outwardly of the fillister means for mounting the embellishing element.

---

The present invention relates to fixed windows or glasses of vehicles, such as the windshield or rear windows of automobile vehicles, and more particularly concerns the mounting of embellishing elements on the periphery of such windows which consist of beadings, strips, or sectional elements.

When a glass is fixed on the body of a vehicle by adhesion, for example by means of a vulcanizing beading, there exists between the edge of this glass and the edge of the fillister in which it is fixed a gap which must be masked by a beading or shaped strip constituting an embellishing element. Generally, this embellishing element is fixed by means of clips or fasteners which are adaptable on studs welded to the body inside the fillister. When this means of mounting the embellishing element is employed, two successive operations are therefore necessary, namely an operation for welding the studs to the body and an operation for clipping the embellishing element to said studs.

The object of the invention is to provide a mounting device whereby it is possible to do away with these studs and dispense with the corresponding welding operation which complicates and somewhat slows down the rate of production of the vehicles.

The invention provides a device for mounting an embellishing element constituted by a beading, sectional element or the like, on the periphery of a glass in a fillister of the body of a vehicle, said device comprising at least one attachment or mount engaged on the edge of the glass and blocked between this edge and the adjacent edge of the fillister, the or each mount comprising on the face thereof facing outwardly of the fillister means adapted for mounting the embellishing element.

According to one embodiment of the invention, each mount comprises a body having an L-shaped cross section whose two branches are respectively parallel to the lateral face and to the edge of the glass, said body having means for hooking and locking the mount between the glass and the fillister of the body and means for mounting the embellishing element on the mount.

The branch of the L-sectioned member which is parallel to the edge of the glass carries, extending from its two opposite edges, two elastically yieldable arms which define in the vicinity of their free ends two bearing faces co-operating with the edge of the glass, whereas the outer face of said branch of the L-sectioned member bears against the corresponding edge of the fillister, said arms further comprising flanges which engage on the lateral face of the glass on the side thereof opposed to that on which the other branch of the L-sectioned member is located thereby maintaining the mount in position relative to the glass and to the body of the vehicle.

The means for mounting the embellishing element comprise projecting portions which extend from the branch of the L-sectioned member parallel to the lateral face of the glass and on which the embellishing element is elastically clipped or engaged.

Another object of the invention is to provide an assembly comprising a fixed glass of a vehicle and a device according to the invention.

Further features and advantages of the invention will be apparent from the ensuing description with reference to the accompanying drawings.

In the drawings:

FIG. 1 is a partial perspective view of a vehicle employing a device according to the invention;

Figure 4:
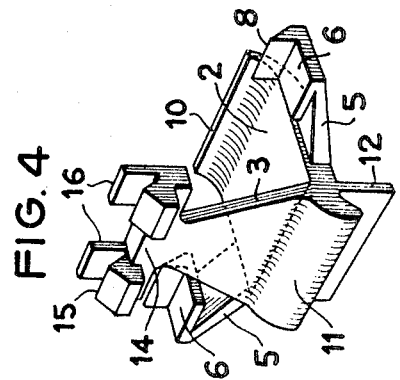
Figure 3:
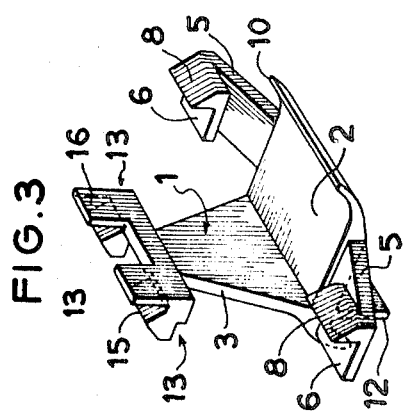
Figure 2:
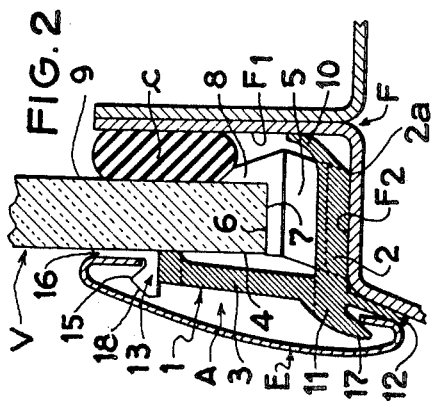
FIG. 2 is a cross-sectional view of the device for mounting the embellishing element.

FIGS. 3 and 4 are perspective views in different directions of a mount employed in the device shown in FIG. 2, and FIGS. 5, 6 and 7 are views corresponding to FIGS. 2, 3 and 4 respectively of another embodiment of the invention.

The invention will first be briefly described with reference to FIG. 1 which shows a fixed windowpane or glass V which is, in this case, a windshield or windscreen mounted on the body C of a vehicle and comprising on its periphery an embellishing element E which is fixed by means of attachments or mounts such as the mount A.

The mounting device for the embellishing element E will be described in greater detail with particular reference to FIG. 2 of the drawing. This FIG. 2 shows a portion of the glass V fixed to one of the edges $F_1$ of a fillister F of the body C, the glass V being fixed to the fillister by means of a vulcanizing beading c in the known manner.

The mount A comprises a body 1 having an L-sectioned shape and comprising two branches 2 and 3 which are roughly parallel to the edge $F_2$ of the fillister and to the lateral face 4 of the glass V respectively. Extending from opposite edges of the branch 2 are two elastically yieldable arms 5 (FIGS. 3 and 4) which are inclined relative to the branch 2 and constitute at their ends bearing faces in contact with the edge 7 of the glass and flanges 8 which are engaged on the lateral face 9 of the glass V. In the free state, the distance between the plane of the faces 6 and the plane of the outer face 2a of the branch 2 exceeds the distance between the edge 7 of the glass and the edge $F_2$ of the fillister. The branch 2 carries a flexible lip 10 at its free end.

The branch 3 of the mount carries in its lower part (as viewed in FIG. 2) a nose 11 and a lip 12. In its upper part, this branch carries two lugs 13 which are connected thereto by zones 14 of reduced section, the lugs 13 each comprising a nose 15 and a lip 16 extending in a direction opposed to the direction in which extend the nose 11 and the lip 12. It will be observed that the noses 11 and 15 each have an outer ramp or inclined face 17, 18 adapted to facilitate the elastic mounting and subsequent clipping of an embellishing element E which has a C-shaped cross section The mount just described is particularly easy to employ. When the glass or windowpane V has been adhered in the fillister F by means of the beading c, a plurality of mounts A are placed in position on the periphery of the glass V by causing each mount to slightly tilt around the edge of the glass in deforming the arms 5 so as to engage them between the edge of the glass and the edge $F_2$ of the fillister. This is facilitated by the presence of the flexible lip 10. After engagement and owing to the resilient action of the arms 5, the bearing faces 6 are applied against the edge of the glass and the mount is then retained by the flanges 8. At the same time, the branch 3 of the mount is perfectly positioned relative to the outer edge of the fillister. The embellishing element E is then clipped without difficulty on the noses 11 and 15 owing to the flexibility of the lugs 13 created by the zones 14 of reduced section. As can be seen from FIG. 2, the lips 12 and 16 prevent a direct contact between the embellishing element E and the body C and the glass V respectively.

The mount just described and shown in FIGS. 2, 3 and 4 is adapted to be mounted on the glass or windowpane after the latter has been fixed by adhesion in the fillister F. There will now be described, with reference to FIGS. 5, 6 and 7, a mount adapted to be mounted on the glass or windowpane before this adhering operation.

Figure 7:
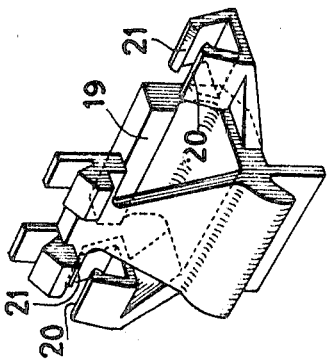
Figure 6:
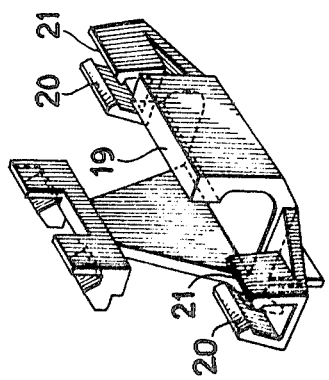
Figure 5:
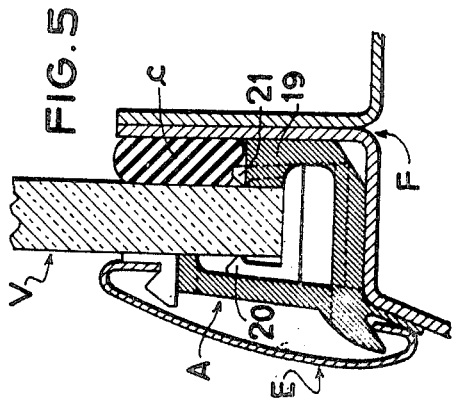

The parts of the mount common to the mount shown in FIGS. 2–4 and to that shown in FIGS. 5–7 are designated by the same reference numerals. In this second embodiment, the flexible lip 10 which was provided at the free end of the branch 2 of the mount is replaced by a heel 19 which constitutes a spacer member between the edge $F_1$ of the fillister and the lateral face 9 of the glass. This permits dispensing with the use of the temporary spacer and positioning members usually employed when adhering the glass to the body According to a second modification also shown in FIGS. 5–7, the arms 5 comprise at their free ends two flanges 20, 21 which face each other and engage on each side of the glass V and thus improve the fixing of the mount on the edge of this glass.

It is obvious from the foregoing description that a mount according to the invention must be made of a material having a certain elasticity and can be, for example, moulded from a plastics material such as polyformol or polyoxyphenylene-nylon. It is obvious that any other elastic material can be employed, including metal such as a spring steel.

The main advantages of a device according to the invention are the following:

no need for studs on the body on which clips fixing the embellishing element are engaged,
no need to weld these studs, with a corresponding appreciable saving in time;
simplicity of mounting the embellishing element;
no direct contact between the embellishing element and the body and glass;
a perfectly detachable mounting of the embellishing element and mounts;
in one embodiment of the mount, there is no need for the positioning and packing blocks which are heretofore employed when fixing the glass;
any clearance which might exist due to manufacturing tolerances and assembly tolerances between the edge of the glass and the adjacent edge of the fillister is taken up owing to the elasticity of the arms constituting the bearing faces bearing on the edge of the glass.

Although specific embodiments of the invention have been described, many modifications and changes may be made therein without departing from the scope of the invention.

Having now described my invention what I claim and desire to secure by Letters Patent is:

1. A device for mounting an embellishing element on the periphery of a fixed glass in a fillister in a vehicle body, said device comprising at least one mount adapted to be engaged on an edge of the glass and blocked between said edge and an adjacent face of the fillister, the mount comprising on a side thereof facing outwardly of the fillister means adapted for mounting the embellishing element.

2. A device for mounting an embellishing element on the periphery of a fixed glass in a fillister in a vehicle body, said device comprising at least one mount adapted to be engaged on an edge of the glass and blocked between said edge and an adjacent face of the fillister, the mount comprising on a side thereof facing outwardly of the fillister means adapted for mounting the embellishing element, the mount comprising a body which has an L-shaped cross section and has a first branch and a second branch which are respectively parallel to a lateral face and the edge of the glass, said body of the mount carrying means for hooking and locking the mount between the glass and the fillister and means for mounting the embellishing element on the mount.

3. A device for mounting an embellishing element on the periphery of a fixed glass in a fillister in a vehicle body, said device comprising at least one mount adapted to be engaged on an edge of the glass and blocked between said edge and an adjacent face of the fillister, the mount comprising on a side thereof facing outwardly of the fillister means adapted for mounting the embellishing element, the mount comprising a body which has an L-shaped cross section and has a first branch and a second branch which are respectively parallel to a lateral face and the edge of the glass, the second branch having opposite edges from which extend two elastically-yieldable arms which define, in the vicinity of free ends thereof, two bearing faces co-operative with the edge of the glass, said second branch having an outer face adapted to bear against a corresponding face of the fillister, said arms further comprising flanges adapted to engage the lateral face of the glass on a side thereof opposed to a side on which the first branch of said L-sectioned body is located, whereby the mount is maintained in position relative to the glass and to the vehicle body.

4. A device for mounting an embellishing element on the periphery of a fixed glass in a fillister in a vehicle body, said device comprising at least one mount adapted to be engaged on an edge of the glass and blocked between said edge and an adjacent face of the fillister, the mount comprising on a side thereof facing outwardly of the fillister means adapted for mounting the embellishing element, the mount comprising a body which has an L-shaped cross section and has a first branch and a second branch which are respectively parallel to a lateral face and the edge of the glass, said body of the mount carrying means for hooking and locking the mount between the glass and the fillister and means for mounting the embellishing element on the mount which comprise projections which extend from said first branch and on which the embellishing element is elastically engageable.

5. A device as claimed in claim 4, comprising in the vicinity of said projections flexible lips integral with the L-sectioned body and adapted to be interposed between the embellishing element, on one hand, and the vehicle body and the glass on the other hand.

6. A device as claimed in claim 4, comprising mount-mounting projections in an upper part and in a lower part of said first branch, said mount-mounting projections extending in substantially opposite directions and the embellishing element having a cross-sectional shape adapted to allow the embellishing element to be elastically clipped on said mount-mounting projections.

7. A device as claimed in claim 6, wherein one of said mount-mounting projections is located on a tab which is pivotable relative to said first branch.

8. A device as claimed in claim 4, wherein each of said projections have on outer faces thereof a ramp which facilitates the positioning and clipping of the embellishing element thereon.

9. A device as claimed in claim 2, wherein said arms carry at free ends thereof two parallel flanges which are adapted to engage on each side of the glass.

10. A device as claimed in claim 1, wherein the mount comprises on a face thereof adapted to face inwardly of the fillister a heel adapted to be interposed between a lateral face of the glass and an adjacent face of the fillister and serve as a spacer member when fixing the glass in the fillister.

11. An assembly comprising a fixed glass, a vehicle having a fillister and an embellishing element mounted on the periphery of the glass in the fillister by means of a mounting device comprising at least one mount engaged on an edge of the glass and blocked between said edge and an adjacent face of the fillister, the mount comprising on a side thereof facing outwardly of the fillister means mounting the embellishing element.

References Cited

UNITED STATES PATENTS 3,155,422    11/1964    Campbell et al. _____ 52—397 X
3,478,476    11/1969    Kemp _____ 52—397

PATRICK D. LAWSON, Primary Examiner